United States Patent [19]

Martin

[11] Patent Number: 4,998,905
[45] Date of Patent: Mar. 12, 1991

[54] MULTIPLE SPEED PULLEY ASSEMBLY

[75] Inventor: Gregory D. Martin, Sheboygan Falls, Wis.

[73] Assignee: Lawn-Boy, Inc., Plymouth, Wis.

[21] Appl. No.: 518,153

[22] Filed: May 3, 1990

[51] Int. Cl.$^5$ .............................................. F16H 55/36
[52] U.S. Cl. ...................................... 474/42; 474/903
[58] Field of Search ................................... 474/37–42, 474/95–99, 902, 903, 174, 179–183

[56] References Cited

U.S. PATENT DOCUMENTS

| | | | |
|---|---|---|---|
| 1,756,592 | 4/1930 | Harrison | 474/37 |
| 2,234,917 | 3/1941 | Koch | 474/42 |
| 2,555,189 | 5/1951 | Fuchslocher | 474/42 |
| 2,635,474 | 4/1953 | Hennings | 474/42 |
| 2,754,689 | 7/1956 | Ritz | 474/42 |
| 2,943,499 | 7/1960 | Fircth | 474/41 |
| 3,601,246 | 8/1969 | Dubois | 474/42 X |
| 4,177,685 | 12/1979 | DeLancey | 474/42 |
| 4,226,133 | 11/1980 | Hanke | 474/42 |

Primary Examiner—Thuy M. Bui
Attorney, Agent, or Firm—John T. Synnestvedt; Richard D. Weber

[57] ABSTRACT

An adjustable V-belt pulley which may be selectively changed form one predetermined effective diameter to another without tools. The pulley comprises first and second separable pulley halves having juxtaposed frusto-conical faces adapted to receive a V-belt pulley therebetween. A plurality of spaced lugs extend axially from the first pulley half and a plurality of sets of cavities are provided in the second pulley half, each set being adapted to receive the lugs of the first pulley half. Each cavity set has a different cavity depth so that the effective pulley diameter is established by the choice of the cavity set into which the lugs are inserted. The pulley halves are concentrically disposed on a shaft and are held together by a wing nut or knurled nut on the threaded shaft end which clamps the pulley halves against a shoulder of the shaft.

8 Claims, 2 Drawing Sheets

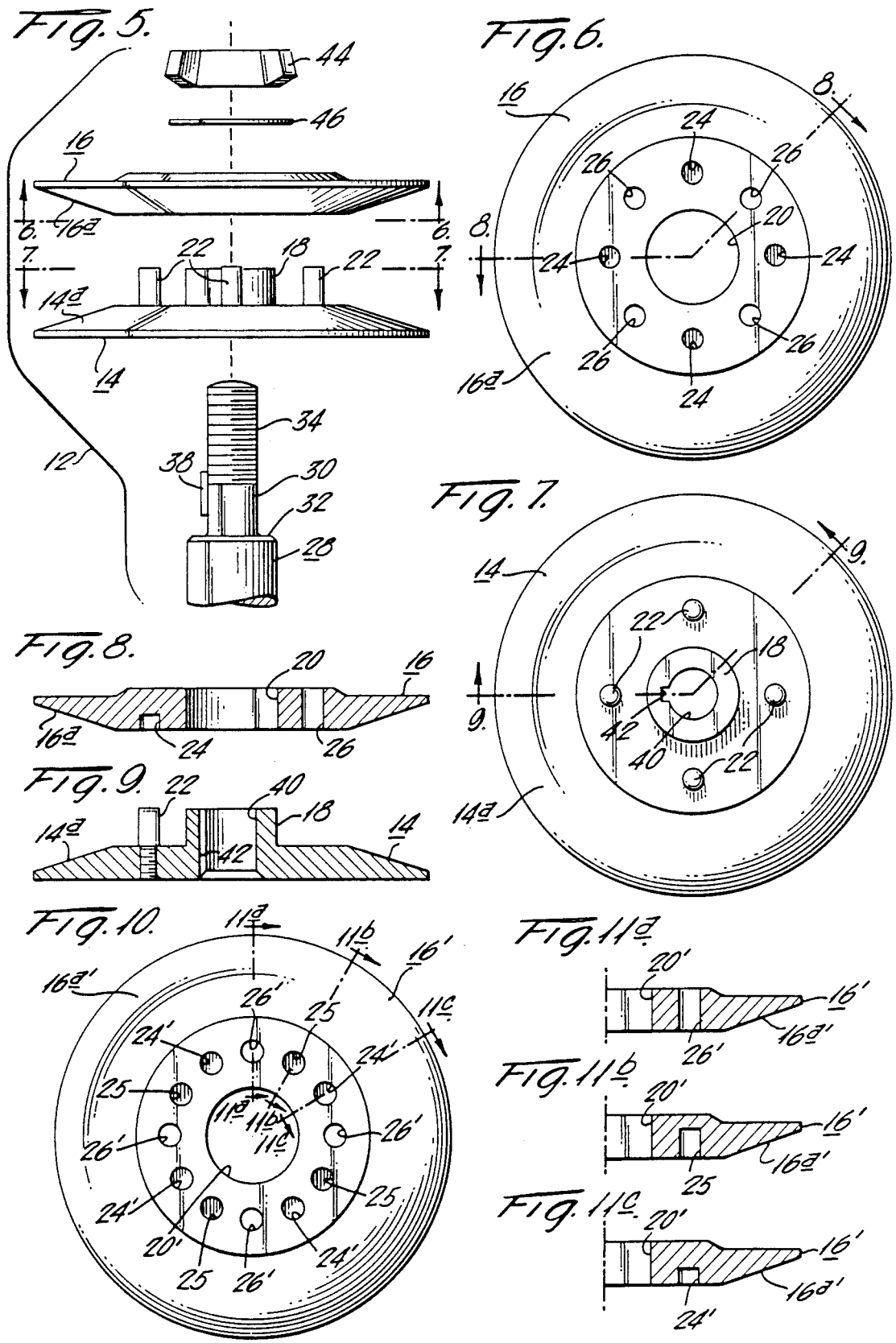

MULTIPLE SPEED PULLEY ASSEMBLY

BACKGROUND OF THE INVENTION

1. Field of the Invention

The present invention relates generally to power transmission devices and more particularly to V-belt drive mechanisms of the type wherein a V-belt pulley is adjustable to change its effective diameter.

2. Description of the Prior Art

V-belt drives are widely used in machinery and power driven equipment of many types, including lawn care equipment. A typical use, for example, would be to transmit power to the drive wheels for propelling a mower along the ground. In certain situations, it may be desirable to provide a choice of several speeds for such equipment, but without the weight and expense of a gear box. A variable pitch V-belt pulley or pulleys can provide the desired adjustment.

Various types of variable pitch V-belt pulleys have been previously proposed and which feature split pulley halves which were selectively adjustable by some type of mechanism on the pulley hubs. Typically, this mechanism involved a threaded male portion of one pulley half hub joined with a female threaded portion of an opposed pulley half hub. The pulley halves could be selectively rotatably positioned and fixed in the desired position by means of a screw or the like to establish the desired pitch diameter of the pulley. Examples of such arrangements are shown in U.S. Pat. Nos. 2,234,917, 4,177,685 and 4,226,133. A variation on this basic design is shown in U.S. Pat. No. 2,555,189 wherein both pulley halves are threadedly adjustable on a threaded bushing and secured at the desired spacing thereon by means of set screws engaging slots in the bushing.

A different although related arrangement for varying the spacing of a variable pitch V-belt pulley is shown in U.S. Pat. No. 1,756,592 wherein a diagonal slot is provided in the hub of one pulley half which is disposed in telescoping relation with the hub of the opposed pulley half which carries a bolt engaged in the diagonal slot. Relative rotation of the pulley halves with the bolt loosened permits the adjustment of the pulley to the desired pitch diameter, whereupon the bolt can be tightened to fix the pulley halves at the desired effective diameter.

Although the described prior art devices will accomplish the objective of varying the pulley pitch diameter, the structures are complex and expensive to produce. Furthermore, the prior art devices typically are larger and heavier in view of their elaborate hub structure. A further disadvantage of the typical prior art device is the need for tools to effect a change in the pulley diameter and sufficient skill and experience to provide the desired speed adjustment. Since the devices typically allow an infinite speed adjustment within certain ranges, it may be difficult to establish a particular desired pulley diameter without some trial and error.

SUMMARY OF THE INVENTION

The present invention provides a multiple speed V-belt pulley assembly which permits a rapid change of effective pulley diameter without tools or special skill. The assembly permits the selection of any one of a plurality of preset pulley diameters, eliminating the need for any trial and error settings.

Structurally, the present adjustable pulley comprises first and second separable pulley halves having juxtaposed frusto-conical faces adapted to receive a V-belt therebetween. A plurality of spaced lugs extend axially from one of said pulley halves, and a plurality of sets of cavities in the other pulley half are each adapted to receive said lugs. Each cavity set has a different cavity depth to establish predetermined pulley half spacings and hence effective pulley pitch diameters. Means are provided for demountably securing the pulley halves together with the lugs disposed in a selected one of the sets of cavities. In the preferred form of the invention, this means comprises a knurled nut or a wing nut threadedly securing the pulley halves on a threaded shaft, which nut can be loosened and tightened without the need for tools.

It is accordingly a primary object of the invention to provide a multiple speed V-belt pulley assembly, the effective diameter of which can be readily changed without tools or extra parts.

Another object of the invention is to provide an adjustable pulley as described which can be quickly adjusted to any one of a plurality of predetermined diameters.

A further object of the invention is to provide an adjustable pulley as described of a simple, light weight construction which can be inexpensively manufactured.

Additional objects and advantages of the invention will be more readily apparent from the following detailed description of embodiments thereof when considered in conjunction with the accompanying drawings.

BRIEF DESCRIPTION OF THE DRAWINGS

FIG. 5 is an exploded reduced side elevational view of the pulley assembly shown in FIGS. 1-4;

FIG. 6 is a view taken along line 6—6 of FIG. 5;

FIG. 7 is a view taken along line 7—7 of FIG. 5;

FIG. 8 is a sectional view taken along line 8—8 of FIG. 6;

FIG. 9 is a sectional view taken along line 9—9 of FIG. 7;

FIG. 10 is a view similar to FIG. 6 but showing a modified pulley half structure providing a third effective pulley diameter setting;

FIG. 11a is a sectional view taken along line 11a–11a of FIG. 10;

FIG. 11b is a sectional view taken along line 11b–11b of FIG. 10; and

FIG. 11c is a sectional view taken along line 11c–11c of FIG. 10.

DESCRIPTION OF THE PREFERRED EMBODIMENT

Figure 3:
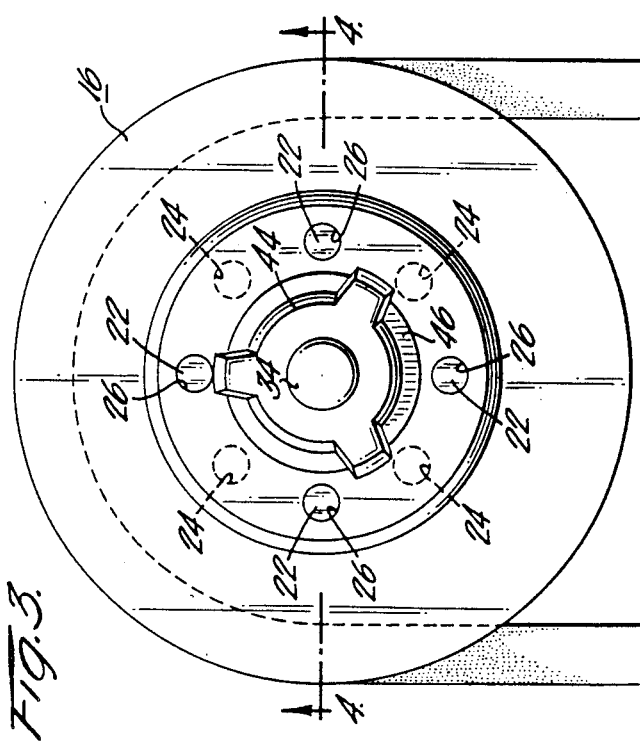
FIG. 3 is a view similar to FIG. 1 showing the pulley of FIG. 1 in its larger diameter setting.

Referring to the drawings and particularly FIGS. 5–9 thereof, an adjustable V-belt pulley assembly generally designated 12 includes first and second pulley halves 14 and 16 having juxtaposed frusto-conical faces 14a and 16a which are adapted to receive a V-belt therebetween. The first pulley half 14 includes an inwardly directed substantially cylindrical hub portion 18 and the second pulley half 16 includes a cylindrical bore 20 adapted to slidingly fit over the hub portion 18.

As shown most clearly in FIGS. 5 and 7, a plurality of spaced lugs 22, specifically four lugs, are arranged at 90° intervals in a circular array concentric with the hub portion 18. Juxtaposed from the lugs 22 in the second pulley half are first and second sets of cavities 24 and 26, each cavity set being sized and disposed in a circular array on the second pulley half 16 so as to receive the set of lugs 22 in one or the other of the sets of cavities 24 or 26, depending on the rotational alignment of the lugs and cavities. In the relative position of the pulley halves shown in FIGS. 5-9, the lugs 22 are aligned to seat within the cavities 24.

Figure 4:
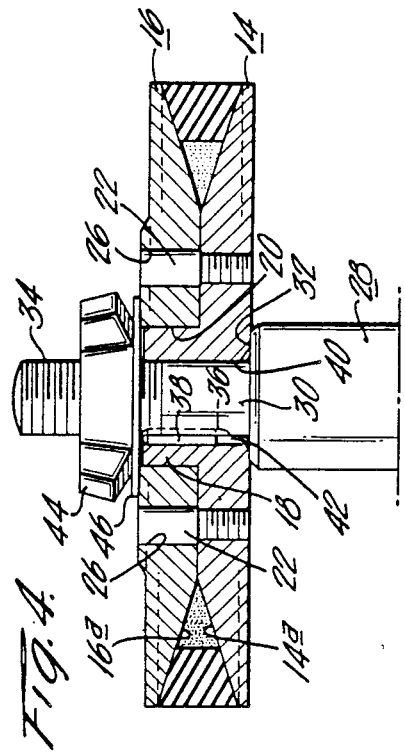
FIG. 4 is a sectional view taken along line 4—4 of FIG. 3.
Figure 1:
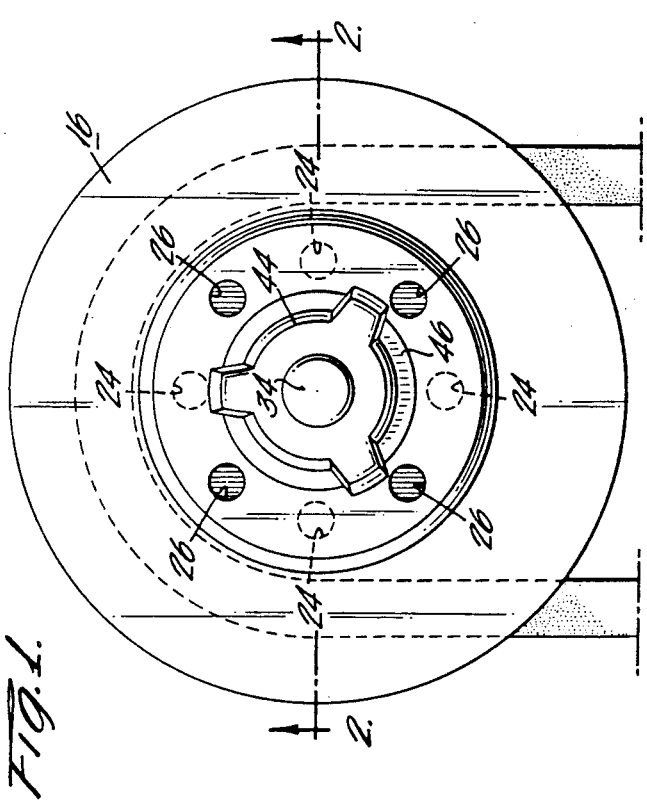
FIG. 1 is a plan view of an adjustable V-belt pulley in accordance with the invention shown mounted on a vertically oriented shaft with the pulley adjusted to its smaller diameter setting.

Although the lugs 22 are each of the same axial length, the cavities 24 are of a shorter depth than the cavities 26, which in fact extend through the second pulley half. Accordingly, the disposition of the lugs 22 in the cavities 24 will result in a substantial spacing of the pulley halves when they are brought together as is shown for example in FIGS. 1 and 2. Alternatively, the adjustment of the rotational alignment of the pulley halves so as to dispose the lugs 22 in the cavities 26 will result in a closer spacing of the pulley halves as shown in the views of FIGS. 3 and 4.

Means are provided for demountably securing the pulley halves 14 and 16 together with the lugs disposed in a selected one of the sets of cavities 24 or 26. In the preferred embodiment illustrated, this means comprises a shaft 28 having an end 30 of reduced diameter to establish a shoulder 32 thereon. A portion of the shaft end 30 is threaded at 34 and a keyway 36 (FIGS. 2 and 4) is provided in the shaft end to receive a key 38. The first pulley half 14 includes a concentric bore 40 within the hub portion 18, which bore includes a keyway 42 as shown most clearly in FIG. 7.

Figure 2:
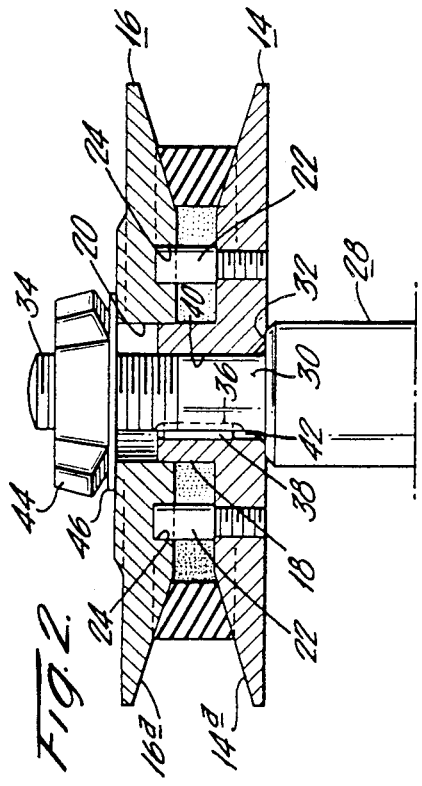
FIG. 2 is a sectional view taken along line 2—2 of FIG. 1.

Upon assembly of the pulley, the first pulley half 14 is placed on the shaft end 30 with the key 38 engaged in the keyway 36 of the shaft and aligned keyway 42 of the first pulley member. As shown in FIGS. 2 and 4, in the assembled position of the pulley assembly, the first pulley half 14 bears against the shoulder 32 of the shaft 28. The second pulley half 16 is disposed positioned concentrically over the shaft end 30 and is rotatably aligned with the first pulley half 14 to selectively engage the lugs 22 thereof with either the shallow set of cavities 24 or the deeper set 26. With the lugs arranged at equally spaced intervals of 90° and the cavity sets disposed at a 45° spacing, only a 45° rotation of the pulley halves is necessary to change the effective pulley diameter. It is preferred that the hub portion 18 extend axially beyond the lugs 22 to permit engagement thereof with the cavity 20 of the second pulley half prior to engagement of the lugs 22 with the cavities 24 or 26 to thereby permit an axial alignment of the pulley halves prior to the rotational alignment of the lugs and cavities.

With the first and second pulley halves disposed with the lugs 22 in the desired set of cavities 24 or 26, the pulley halves are secured together by means of the wing nut 44 which is manually tightened on the threaded end 34 of the shaft 28 outboard of the second pulley half 16, a washer 46 preferably being interposed between the wing nut 44 and the second pulley half. Optionally, a knurled nut could be substituted for the wing nut 44, either of which would permit the manual assembly and disassembly of the pulley to adjust its diameter without the need for tools.

The embodiment of FIGS. 10 and 11 a-c is quite similar to the embodiment of FIGS. 1-9 described above, the principal difference being the provision of a third set of cavities, thereby permitting three possible effective pulley diameters rather than two. Although the embodiment of FIGS. 10 and 11 a-c includes first and second pulley halves, the first pulley half containing the lugs is identical with the pulley half 14 described above. Accordingly, only the second pulley half 16' is illustrated in FIGS. 10 and 11.

As shown in FIG. 10, the second pulley half 16 of the modified embodiment includes a shallow set of cavities 24', and a deep set of cavities 26' (extending axially through the pulley half) as well as an intermediate depth set of cavities 25. The cavity sets 24', 25 and 26' are angularly spaced at equal intervals of 30° so that only a 30° rotation of the pulley halves is required to align the lugs with a different set of cavities.

The assembly and use of the modified embodiment is the same as that described above with respect to the embodiment of FIGS. 1-9.

From the foregoing, it will be obvious that the number of cavity sets can be chosen to suit the particular purpose for which the pulley is to be used and is limited only by the space available on the second pulley half for the cavity sets.

The number of lugs may vary although it is preferred that there be at least three lugs and that the lugs be equally spaced so that the pulley will be balanced, the pulley halves will be maintained in a parallel relation, and the alignment of the lugs with the cavity sets can be accomplished with a minimal amount of relative rotation of the pulley halves.

From the foregoing it can be appreciated that the present invention provides a simple, inexpensive, lightweight multiple speed pulley assembly, the effective diameter of which can be quickly changed without tools or extra parts.

Manifestly, changes in details of construction can be effected by those skilled in the art without departing from the invention.

I claim:

1. An adjustable V-belt pulley comprising first and second separable pulley halves, said pulley halves having juxtaposed frusto-conical faces adapted to receive a V-belt therebetween, a plurality of spaced lugs extending axially from said first pulley half, and a plurality of sets of cavities in said second pulley half, each said cavity set being adapted to receive said lugs of said first pulley half, each cavity set having a different cavity depth, and means for demountably securing said pulley halves together with said lugs disposed in a selected one of said sets of cavities, the effective diameter of said pulley being determined by the selection of the set of cavities into which said lugs are disposed.

2. The invention as claimed in claim 1, wherein said lugs are uniformly spaced in a circular pattern concentric with said frusto-conical surface of said first pulley half.

3. The invention as claimed in claim 2, wherein said lugs are substantially cylindrical in shape and extend axially from said first pulley half.

4. The invention as claimed in claim 1, comprising means for axially aligning said pulley halves.

5. The invention as claimed in claim 4, wherein said means for axially aligning said pulley halves comprises a hub portion on one of said pulley halves, and a bore on the other one of said pulley halves for slidably receiving said hub portion.

6. A shaft-mounted adjustable V-belt pulley assembly comprising a shaft, one end of said shaft being of reduced diameter and having a threaded end portion, a shoulder on said shaft formed by the reduction in diameter thereof, a V-belt pulley disposed on the reduced diameter end of said shaft, said pulley comprising first and second separable pulley halves, said pulley halves having juxtaposed frusto-conical faces adapted to receive a V-belt therebetween, a plurality of spaced lugs extending axially from said first pulley half, and a plurality of sets of cavities in said second pulley half, each said cavity set being adapted to receive said lugs of said first pulley half, each cavity set having a different cavity depth, an axially extending hub portion on said first pulley half having a bore therein for receiving said reduced diameter shaft end, said first pulley half being disposed on said shaft against said shaft shoulder with said hub portion disposed axially outwardly, means for preventing relative rotation of said shaft and first pulley half, said second pulley half having a bore therein adapted to receive said hub portion and being disposed on said shaft end with said hub portion disposed at least partially within said bore, and means threadedly engaged with said shaft end outboard of said pulley halves for demountably securing said pulley halves together on said shaft.

7. The invention as claimed in claim 6, wherein said lugs are uniformly spaced in a circular pattern concentric with said frusto-conical surface of said first pulley half.

8. The invention as claimed in claim 7, wherein said lugs are substantially cylindrical in shape and extend axially from said first pulley half.

* * * * *